United States Patent
Hirai

(10) Patent No.: US 11,641,234 B2
(45) Date of Patent: May 2, 2023

(54) INTERFERENCE DETECTION AND INTERFERENCE SUPPRESSION OF REVERSE LINK COMMUNICATION IN FEEDER LINK OF HAPS COMMUNICATION SYSTEM

(71) Applicant: HAPSMobile Inc., Tokyo (JP)

(72) Inventor: Ryoji Hirai, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/622,425

(22) PCT Filed: Feb. 13, 2020

(86) PCT No.: PCT/JP2020/005485
§ 371 (c)(1),
(2) Date: Dec. 23, 2021

(87) PCT Pub. No.: WO2021/002045
PCT Pub. Date: Jan. 7, 2021

(65) Prior Publication Data
US 2022/0209845 A1 Jun. 30, 2022

(30) Foreign Application Priority Data
Jul. 3, 2019 (JP) .............................. JP2019-124654

(51) Int. Cl.
*H04B 7/185* (2006.01)
*H04B 17/345* (2015.01)
*H04B 7/204* (2006.01)

(52) U.S. Cl.
CPC ........... *H04B 7/185* (2013.01); *H04B 7/2041* (2013.01); *H04B 17/345* (2015.01)

(58) Field of Classification Search
CPC .................. H04B 7/185–2041; H04B 17/345
See application file for complete search history.

(56) References Cited

U.S. PATENT DOCUMENTS

| 6,684,057 B2 | 1/2004 | Karabinis | |
| 2005/0288011 A1* | 12/2005 | Dutta | H04B 7/18539 455/12.1 |

(Continued)

FOREIGN PATENT DOCUMENTS

WO WO 2018/037512 A1 3/2018

OTHER PUBLICATIONS

Takafumi Fujii, et al., "A Study on Efficient Spectrum Utilization for Feeder Link using Multiple Gateways HAPS System," The Institute of Electronics Information and Communication Engineers, IEICE Technical Report, RCS2018-203, Nov. 2018.

(Continued)

*Primary Examiner* — Raymond S Dean
(74) *Attorney, Agent, or Firm* — Muirhead and Saturnelli, LLC

(57) ABSTRACT

It is detected of an interference of a reverse link communication in a feeder link of a communication relay apparatus, which tends to occur when the number of movable aerial-floating type communication relay apparatuses increases in the same area. A communication system comprises a plurality of movable aerial-floating type communication relay apparatuses that respectively include a relay communication station of performing a service-link radio communication with a terminal apparatus, plural gateway stations that respectively perform a feeder-link radio communication with the plurality of the communication relay apparatuses, and a common baseband processing apparatus connected to the plural gateway stations. The baseband processing apparatus detects an interference of the reverse link communication due to an interference wave from a relay communication station of another communication relay apparatus, the interference wave interfering with a signal wave from the relay communication station of the communication relay (Continued)

apparatus connected to the gateway station, based on plural reception signals received by the plural gateway stations.

9 Claims, 8 Drawing Sheets

(56) References Cited

U.S. PATENT DOCUMENTS

| | | | |
|---|---|---|---|
| 2006/0105707 A1 | 5/2006 | Karabinis | |
| 2007/0037514 A1* | 2/2007 | Karabinis | H04B 7/18532 |
| | | | 455/13.3 |
| 2016/0046387 A1 | 2/2016 | Frolov et al. | |
| 2016/0261291 A1* | 9/2016 | Colella | H04B 1/0064 |
| 2017/0302368 A1* | 10/2017 | Trott | H04B 7/18502 |
| 2020/0380874 A1* | 12/2020 | Fujii | H04B 7/1555 |
| 2022/0149929 A1* | 5/2022 | Fujii | H04W 16/28 |
| 2022/0190908 A1* | 6/2022 | Fujii | H04B 7/18513 |

OTHER PUBLICATIONS

Anggoro K. Widiawan, et al., "High Altitude Platform Station(HAPS): A Review of New Infrastructure Development for Future Wireless Communications," Wireless Personal Communications (2007) 42:387-404, DOI 10.1007/s11277-006-9184-9.
Takafumi Fujii, et al., "A Study on Signal Band Division Interference Canceller for HAPS Feeder Links with Multi-Gateways," 978-1-7281-5207-3/20, 2020 IEEE.

\* cited by examiner

INTERFERENCE DETECTION AND INTERFERENCE SUPPRESSION OF REVERSE LINK COMMUNICATION IN FEEDER LINK OF HAPS COMMUNICATION SYSTEM

TECHNICAL FIELD

The present invention relates to an interference detection and an interference suppression of a reverse link communication in a feeder link of an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is composed of a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

When the number of movable aerial-floating type radio relay apparatuses increases in the same area, interference of reverse link communication may occur between feeder links of plural communication relay apparatuses, and a radio communication quality of the reverse link communication in the feeder link may be deteriorated or the reverse link communication may be cut off.

Solution to Problem

A communication system according to an aspect of the present invention comprises a plurality of movable aerial-floating type communication relay apparatuses that respectively include a relay communication station of performing a service-link radio communication with a terminal apparatus, plural gateway stations that respectively perform a feeder-link radio communication with the plurality of the communication relay apparatuses, and a common baseband processing apparatus connected to the plural gateway stations. The baseband processing apparatus detects an interference of a reverse link communication due to an interference wave from a relay communication station of another communication relay apparatus, the interference wave interfering with a signal wave from the relay communication station of the communication relay apparatus connected to the gateway station, based on the plural reception signals received by the plural gateway stations.

In the foregoing communication system, the baseband processing apparatus may perform a reception process of processing plural reception signals received by the plural gateway stations, as reception signals received by plural antennas, may compare a signal-wave reception level and an interference-wave reception level of the reverse link communication for each of the antennas, based on a reception signal of each of the plural antennas obtained in the reception process, and may determine that the interference of the reverse link communication is occurred, when a difference between the signal-wave reception level and the interference-wave reception level becomes equal to or less than a predetermined threshold value, or when a ratio of the interference-wave reception level to the signal-wave reception level becomes equal to or more than a predetermined threshold value.

In the foregoing communication system, when the interference of the reverse link communication is detected, an interference suppression process for suppressing the interference of the reverse link communication may be performed by making the plural gateway stations in cooperation with each other.

In the foregoing communication system, the relay communication station may comprise a feeder-link communication section that functions as a mobile station for mobile communication that communicates with the gateway station, and a service-link communication section that is connected to the feeder-link communication section and functions as a base station for mobile communication that communicates with the terminal apparatus at a frequency different from that of the feeder link.

A baseband processing apparatus according to another aspect of the present invention is a common baseband processing apparatus connected to plural gateway stations that respectively perform a feeder-link radio communication with a plurality of movable aerial-floating type communication relay apparatuses that respectively include a relay communication station of performing a service-link radio communication with a terminal apparatus. The baseband processing apparatus comprises means for detecting an interference of a reverse link communication due to an interference wave from a relay communication station of another communication relay apparatus, the interference wave interfering with a signal wave from the relay communication station of the communication relay apparatus connected to the gateway station, based on the plural reception signals transferred from the plural gateway stations.

In the foregoing baseband processing apparatus, the baseband processing apparatus may comprise means for performing a reception process of processing plural reception signals received by the plural gateway stations, as reception signals received by plural antennas, means for comparing a signal-wave reception level and an interference-wave reception level of a reverse link communication for each of the antennas, based on a reception signal of each of the plural antennas obtained in the reception process, and means for determining that the interference of the reverse link communication is occurred, when a difference between the signal-wave reception level and the interference-wave reception level becomes equal to or less than a predetermined threshold value, or when a ratio of the interference-wave reception level to the signal-wave reception level becomes equal to or more than a predetermined threshold value.

In the foregoing baseband processing apparatus, the baseband processing apparatus may comprise means for performing an interference suppression process for suppressing the interference of the reverse link communication by making the plural gateway stations in cooperation with each other, when the interference of the reverse link communication is detected.

A method according to yet another aspect of the present invention is a method for detecting an interference of a reverse link communication directing from a relay communication station to a gateway station in feeder links between a plurality of movable aerial-floating type communication relay apparatuses and plural gateway stations, communication relay apparatuses respectively including a relay communication station of performing a service-link radio communication with a terminal apparatus. The method comprises detecting an interference of a reverse link communication due to an interference wave from a relay communication station of another communication relay apparatus, the interference wave interfering with a signal wave from the relay communication station of the communication relay apparatus connected to the gateway station, based on plural reception signals received by the plural gateway stations.

In the foregoing method, the method may comprise performing a reception process of processing plural reception signals received by the plural gateway stations, as reception signals received by plural antennas, comparing a signal-wave reception level and an interference-wave reception level of the reverse link communication for each of the antennas, based on the reception signal of each of the plural antennas obtained in the reception process, and determining that the interference of the reverse link communication is occurred, when a difference between the signal-wave reception level and the interference-wave reception level becomes equal to or less than a predetermined threshold value, or when a ratio of the interference-wave reception level to the signal-wave reception level becomes equal to or more than a predetermined threshold value.

In the foregoing method, the method may comprise executing an interference suppression process for suppressing the interference of the reverse link communication by making the plural gateway stations in cooperation with each other, when the interference of the reverse link communication is detected.

A program according to yet another aspect of the present invention is a program executed by a computer or a processor provided in a common baseband processing apparatus connected to plural gateway stations that respectively perform a feeder-link radio communication with a plurality of plural movable aerial-floating type communication relay apparatuses that respectively include a relay communication station of performing a service-link radio communication with a terminal apparatus. The program comprises a program code for detecting an interference of a reverse link communication due to an interference wave from a relay communication station of another communication relay apparatus other than the relay communication station of the communication relay apparatus connected to the gateway station, based on the plural reception signals received by the plural gateway stations.

In the foregoing program, the program may comprise a program code for performing reception process of processing plural reception signals received by the plural gateway stations, as reception signals received by plural antennas, a program code for comparing a signal-wave reception level and an interference-wave reception level of the reverse link communication for each of the antennas, based on the reception signal of each of the plural antennas obtained in the reception process, and a program code for determining that the interference of the reverse link communication is occurred, when a difference between the signal-wave reception level and the interference-wave reception level becomes equal to or less than a predetermined threshold value, or when a ratio of the interference-wave reception level to the signal-wave reception level becomes equal to or more than a predetermined threshold value.

In the foregoing program, the program may include a program code for performing an interference suppression process for suppressing the interference of the reverse link communication by making the plural gateway stations in cooperation with each other, when the interference of the reverse link communication is detected.

According to the present invention, it is possible to detect an interference of a reverse link communication in a feeder link of a communication relay apparatus, which tends to occur when the number of movable aerial-floating type communication relay apparatuses increases in the same area.

DESCRIPTION OF EMBODIMENTS

Hereinafter, embodiments of the present invention are described with reference to the drawings.

Figure 1:
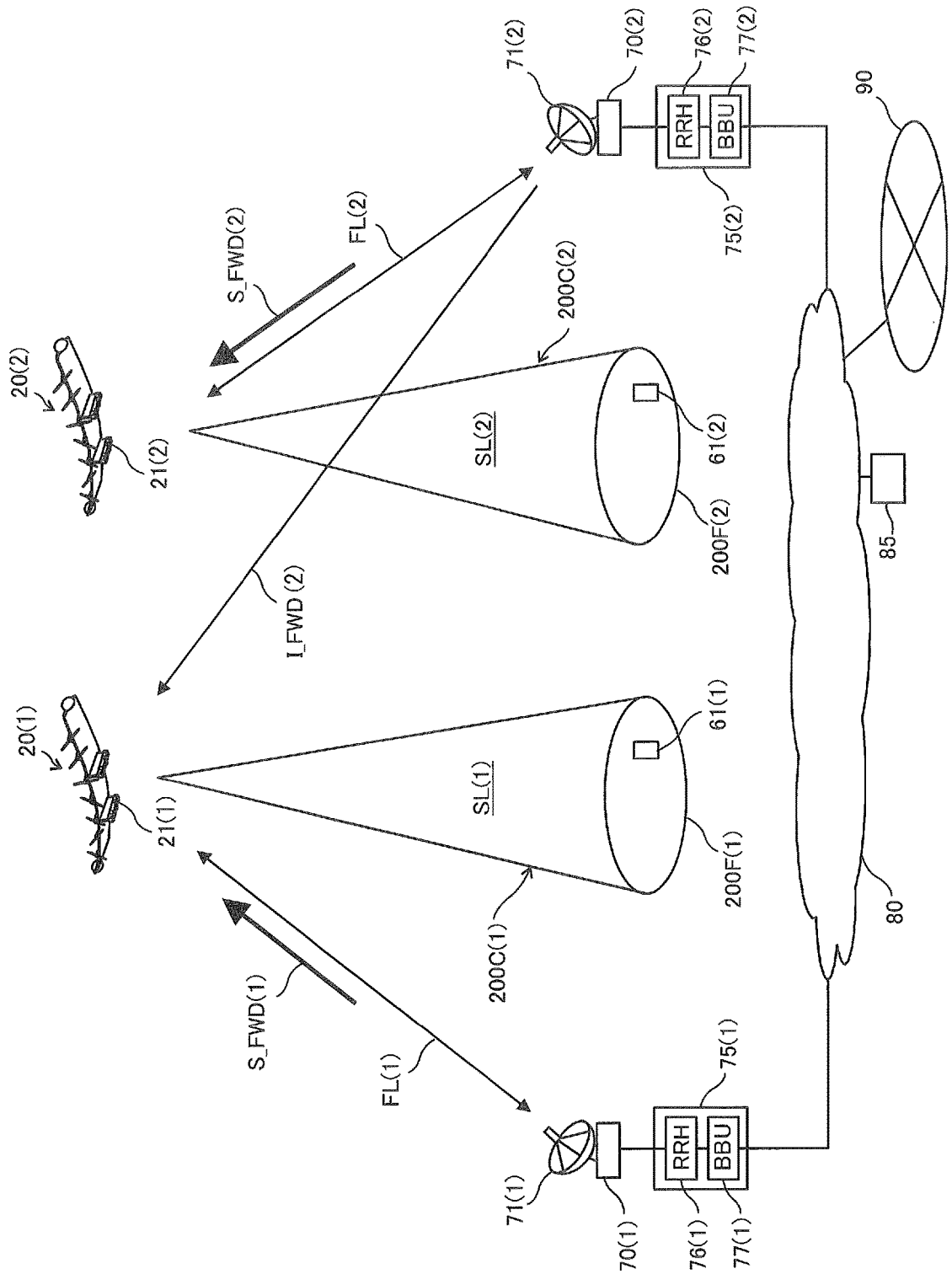
FIG. 1 is an illustration showing an example of a communication system according to an embodiment of the present invention.

FIG. 1 is an illustration showing an example of a communication system according to an embodiment of the present invention. The communication system according to the present embodiment is applicable to the LTE, the 5th generation and later next generation mobile communications, and in particular, suitable for realizing three-dimensional networks of the fifth generation (NR) and later next-generation mobile communications that support simultaneous connections to a large number of terminal apparatuses and low delay, etc.

As shown in FIG. 1, the communication system is provided with plural High-Altitude Platform Stations (HAPS) (also called "high altitude pseudo satellite" or "stratified platform") 20(1) and 20(2) as a plurality of aerial-floating type communication relay apparatuses (radio relay apparatuses). The HAPSs 20(1) and 20(2) are located in an airspace at a predetermined altitude, and forms a three-dimensional cell (three-dimensional area) in a cell-formation target airspace at a predetermined altitude. The HAPSs 20(1) and 20(2) are floating objects or flying objects (for example, airship, solar plane), which are controlled by autonomous control or external control so as to float or fly and to be located in an airspace (floating airspace) with high altitude of 100 [km] or less from the ground level or the sea level, and are respectively equipped with relay communication stations 21(1) and 21(2).

It is noted that, in the example of FIG. 1, although it is shown of the example in which the HAPSs 20(1) and 20(2) are solar-plane type HAPSs and two HAPSs 20(1) and 20(2) are in flight, the number of HAPSs may be 3 or more. The type of HAPS may be different from that of the solar plane, such as an airship and a balloon. Further, in the following description, in case that plural HAPSs and those relay communication stations are not distinguished, they are referred to as HAPS 20, relay communication station 21, etc. without parenthesized numbers.

The airspace in which the HAPS 20 is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular.

The cell-formation target airspace, which is a target airspace for forming a three-dimensional cell with one or two or more HAPS 20 according to the communication system in the present embodiment, is an airspace in a predetermined altitude range (for example, altitude range of 50 [m] or more and 1000 [m] or less) located between the airspace where the HAPS 20 is located and a cell-formation spatial area near the ground level covered by a base station (for example, eNodeB of the LTE, gNodeB of the 5th generation) such as a conventional macro-cell base station.

It is noted that, the cell-formation target airspace where the three-dimensional cell in the present embodiment is formed may be an airspace over the sea, a river or a lake. Further, the three-dimensional cell formed by the HAPS 20 may be formed so as to reach the ground level or the sea level so that it can communicate with a terminal apparatus 61 located on the ground or on the sea.

The relay communication station 21 of the HAPS 20 forms plural beams for wirelessly communicating with the terminal apparatus (also referred to as a "user equipment" (UE)) 61 that is a mobile station used by a user, toward the ground by an antenna for service link (hereinafter referred to as "SL antenna"). The terminal apparatus 61 may be a communication terminal module incorporated in a drone that is an aircraft such as a small helicopter capable of remotely steering, or may be a user equipment (UE) used by a user in an airplane, etc.

A region, through which a beam of a service link formed by the HAPS 20 passes in a cell-formation target airspace, is a three-dimensional cell. For example, the regions, through which the beam of the service link formed by each of the HAPSs 20(1) and 20(2) passes, are a first cell 200C(1) and a second cell 200C(2). In FIG. 1, a terminal apparatus 61(1) is located in the first cell 200C(1) and a terminal apparatus 61(2) is located in the second cell 200C(2).

The relay communication station 21 of the HAPS 20 wirelessly communicates with plural gateway stations (also called "feeder station", hereinafter referred to as "GW station") 70 as relay stations (master repeater) connected to a base station 75 on the ground (or on the sea) side. For example, the relay communication station 21(1) of the HAPS 20(1) wirelessly communicates with a GW station 70(1) connected to a base station 75(1), and the relay communication station 21(2) of the HAPS 20(2) wirelessly communicates with a GW station 70(2) connected to a base station 75(2). The plural base stations 75(1) and 75(2) are time-synchronized with each other.

The relay communication station 21 is connected to a core network 80 of a mobile communication network via the GW station 70 and the base station 75 which are disposed on the ground or on the sea and with which the relay communication station 21 is capable of performing a radio communication by an antenna for feeder link (hereinafter referred to as "FL antenna"). The GW stations 70 for each HAPS may be located at different points from each other on the ground or on the sea, or may be located at the same point. Further, a communication of feeder link between the relay communication station 21 of the HAPS 20 and the GW station 70 may be performed by a radio communication using a radio wave such as a microwave, or may be performed by an optical communication using a laser light or the like.

The GW station 70 may control its own antenna (hereinafter referred to as "GW antenna") 71 so as to track the HAPS 20 moving in the airspace. By tracking the HAPS 20 by the GW antenna 71, even when the GW antenna 71 having high directivity such as a parabolic antenna is used, deterioration of the communication quality of the feeder link due to the movement of the HAPS 20 can be suppressed.

As a control system of a directional beam of the GW antenna 71, various kinds of systems such as a gimbal system, an electric system (360-degrees beamforming control system) and an electric system (angle-limited beamforming control system+antenna switching) can be used.

The base station 75 is configured with, for example, in the case of an LTE eNodeB, a remote radio head (RRH (Remote Radio Head), also called RRU (Remote Radio Unit)) 76 and a baseband apparatus (BBU (Base Band Unit)) 77. It is noted that the RRH 76 and the BBU 77 may be connected to each other by an optical fiber line and disposed apart from each other. The RRH 76 may be incorporated in the GW station 70. Further, plural BBUs 77(1) and 77(2) may be gathered and disposed at one place and may be configured as a common baseband apparatus.

The RRH 76 is provided with, for example, an orthogonal modulation/demodulation section, a transmission section, a reception section, a power amplifier (PA (Power Amplifier)), and a low noise receiver (LNA (Low Noise Amplifier)), and is connected to the GW station 70. The orthogonal modulation/demodulation section performs an orthogonal modulation/demodulation of the OFDM signal processed by the BBU and converts it into an analog signal (RF signal). The transmission section converts the frequency of the RF signal generated by the orthogonal modulation/demodulation section into a frequency to be transmitted as a radio wave. The reception section converts the frequency of the high-frequency signal of the received radio wave into a frequency processed by the orthogonal modulation/demodulation section. The power amplifier (PA) power-amplifies the RF signal generated by the transmission section. The low noise receiver (LNA) amplifies the received weak radio waves and passes them to the reception section.

The BBU 77 is provided with, for example, a base-station control section, a transmission-line interface section, a timing control section and a baseband section, and is connected to the core network 80 of the mobile communication network via a predetermined interface (for example, the S1 interface). The base-station control section performs a total control of the base station, call control protocols and a monitoring of the control. The transmission-line interface section is connected to a packet transmission line such as Ethernet (registered trademark) to the core network or the like, and processes a predetermined protocol to send and receive IP packets. The timing control section generates various kinds of clocks to be used inside the base station, based on a reference clock extracted from the signal received via the packet transmission path or the GNSS (Global Navigation Satellite System) reception signal from the artificial satellite. The baseband section performs a conversion (modulation and demodulation) between the IP packet sent and received through the transmission-line interface section and the OFDM signal (baseband signal) that is a radio signal.

Each of the HAPS 20 may autonomously control a floating movement (flight) of the HAPS itself and a process in the relay communication station 21 by executing a control program by a control section that is configured with a computer or the like incorporated inside of the HAPS. For example, each HAPS 20 may acquire current position information on the HAPS itself (for example, GPS position information), position control information (for example, flight schedule information) stored in advance, position information on another HAPS located in a peripheral space or the like, and may autonomously control the floating movement (flight) and the process in the relay communication station 21 based on these pieces of information.

The floating movement (flight) of each HAPS 20 and the process in the relay communication station 21 may be controlled by a central control server 85 as a remote control apparatus provided in a communication center or the like, which is connected to the core network 80 of the mobile communication network. The central control server 85 can be configured by, for example, a computer apparatus such as a PC or a server that can load a program and execute it. In this case, the HAPS 20 is provided with a control communication section (for example, a mobile communication module) described later for receiving control information from the central control server 85 and transmitting various kinds of information such as monitoring information to a predetermined destination such as the central control server 85. The control communication section may be assigned terminal identification information (for example, IP address, telephone number, etc.) so as to communicate with the central control server 85. The MAC address of the communication interface may be used to identify the control communication section of the HAPS 20.

Transmission/reception of control information and monitoring information between the HAPS 20 and the central control server 85 can be performed, for example, via an LTE communication line via the core network 80 of the mobile communication network, the base station 75, and the GW station 70. The transmission/reception of control information and monitoring information may be performed using a satellite line for mobile communication via an artificial satellite, or may be performed using a satellite line via the Internet 90 and an artificial satellite.

The monitoring information transmitted from the HAPS 20 may include at least one of information regarding the floating movement (flight) of the HAPS itself or a surrounding HAPS and/or the process at the relay communication station 21, reception monitor information obtained with the HAPS 20 by measuring the reception power of the feeder link with the GW station 70, information regarding a status of the HAPS 20 and information of observation data acquired by various kinds of sensors and the like. The monitoring information may include at least one of information on current position, attitude information, flight route information (flight schedule information, flight-route history information), velocity relative to the air, velocity relative to the ground and propulsion direction of the HAPS 20, wind velocity and wind direction of the airflow around the HAPS 20, and atmospheric pressure and temperature around the HAPS 20. The control information may include information on target flight route of the HAPS 20.

The HAPS 20 and the central control server 85 may acquire weather forecast information for an area including a radio propagation path of a feeder link, maintenance schedule information on the GW station 70 or the base station 75, reception-level monitor information on the feeder link with the GW station 70 which is measured by the HAPS 20, flight path information on the HAPS 20, current position information and attitude information on the HAPS 20, and position information on the GW station 70. These kinds of information may be acquired, for example, from the server of the core network (mobile communication network) 80 or the server of the Internet 90, which manages each piece of information. The central control server 85 may acquire the maintenance schedule information on the GW station 70 or the base station 75 from the GW station 70 or the base station 75 via the core network 80 of the mobile communication network by a predetermined interface (for example, the S1 interface of the LTE), or may acquire the maintenance schedule information from the management server that manages the GW station 70 or the base station 75.

Duplex methods of uplink and downlink for radio communication between the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus at the same time/same frequency, and may be an MU-MIMO (Multi-User MIMO) technology in which one base station transmits signals to plural different communication terminal apparatuses at the same time/same frequency or plural different base stations transmit signals to one terminal apparatus at the same time/same frequency.

It is noted that, in the following embodiments, although a case in which a communication relay apparatus having the relay communication station 21 that wirelessly communicates with the terminal apparatus 61 is a solar-plane type HAPS 20 is illustrated and described, the communication relay apparatus may be an unmanned-airship type or a balloon type HAPS. Further, the following embodiments can be similarly applied to other aerial-floating type communication relay apparatuses other than the HAPS.

A link between the HAPS 20 and the base station 75 via the GW station 70 is referred to as "feeder link (FL)", and a link between a HAPS 10 and the terminal apparatus 61 is referred to as "service link (SL)". In particular, a spatial section between the HAPS 20 and the GW station 70 is referred to as a "radio section of feeder link". Further, a communication from the GW station 70 to the terminal apparatus 61 via the HAPS 20 is referred to as a "forward link" communication, and a communication from the terminal apparatus 61 to the GW station 70 via the HAPS 20 is also referred to as a "reverse link" communication.

In FIG. 1, although the HAPS 20 is located, for example, in the stratosphere with an altitude of about 20 km, and forms one feeder link with one GW station 70, the HAPS 20 forms one cell 200C, and a diameter of a service area consisting of a footprint 200F of the cell 200C is, for example, 100 to 200 km, it is not limited to these configurations. For example, the number of cells formed by the HAPS 20 may be 2 or more. The HAPS 20 may form plural feeder links with the plural GW stations 70.

In the communication system of the present embodiment having the aforementioned configuration, when the number of HAPSs 20 capable of moving in an upper airspace increases in a same common area, an interference may occur between the feeder links of plural HAPSs 20 depending on the flight path of each HAPS 20 and the frequency used in each HAPS 20.

For example, in case that a feeder-link communication section of the HAPS, which is one of the plural HAPSs 20 flying in the common area, also receives the signal of the feeder link for another HAPS, an interference of the forward link communication may occur between the feeder links. When the interference of the forward link communication occurs between the feeder links, the radio communication quality of the forward link communication in the feeder link may deteriorate, or the forward link communication may be cut off.

Therefore, the base station 75 of the present embodiment detects the interference of the forward link communication due to the interference wave from another base station other than the base station connected with the HAPS 20, based on a measurement report of the feeder link received from the HAPS 20.

Figure 2:
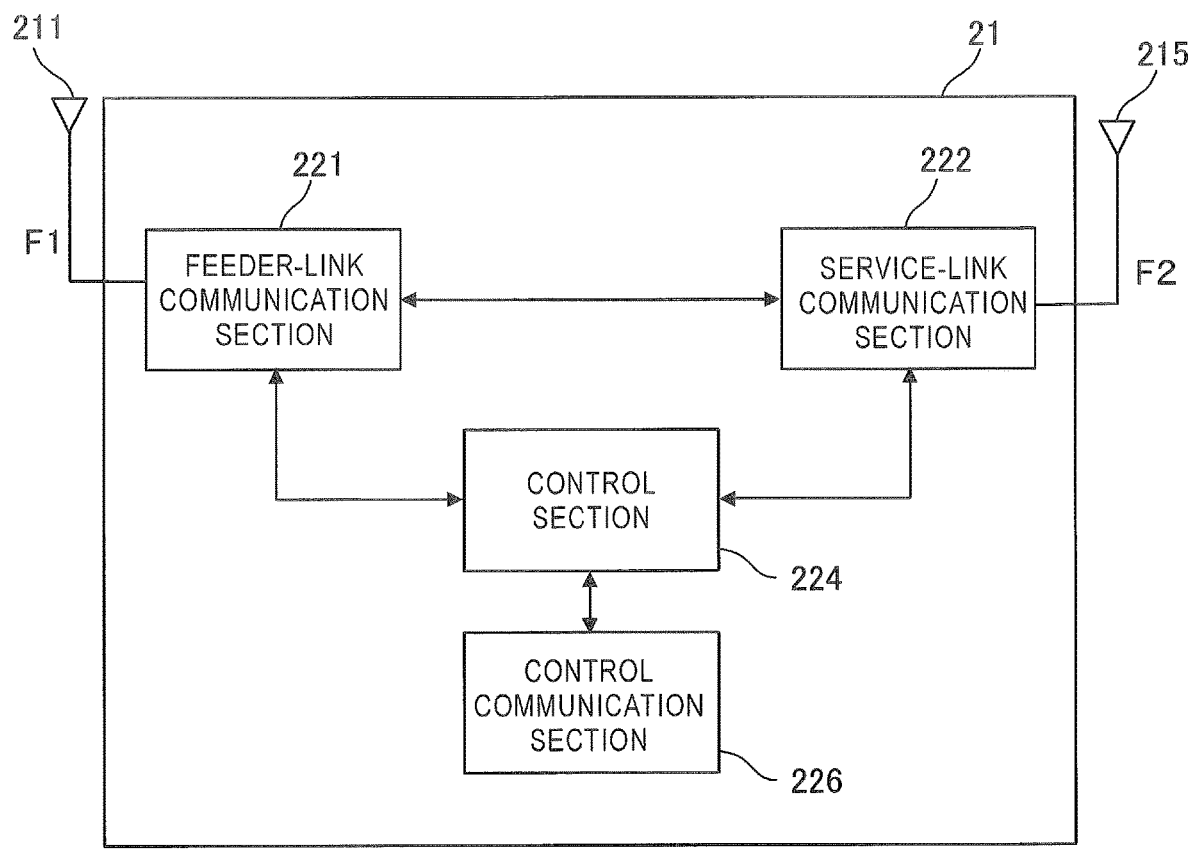
FIG. 2 is a block diagram showing an example of a main configuration of a relay communication station of a HAPS according to the embodiment.

FIG. 2 is a block diagram showing an example of a main configuration of the relay communication station 21 of the HAPS 20 according to the present embodiment. In FIG. 2, the relay communication station 21 is provided with a feeder-link communication section 221, a service-link communication section 222, a control section 224 that controls each section, and a control communication section 226.

The feeder-link communication section 221 has a function equivalent to that of a mobile station in a terrestrial-cellular mobile communication. The feeder-link communication section 221 transmits and receives a radio signal of feeder link frequency F1 to and from the GW station 70 via the FL antenna 211.

The service-link communication section 222 has a function equivalent to that of a base station (for example, eNodeB or gNodeB) in the terrestrial-cellular mobile communication. The service-link communication section 222 is connected to the feeder-link communication section 221, and transmits and receives a radio signal of service link frequency F2 different from the feeder link frequency F1 to and from the terminal apparatus 61 via the FL antenna 211.

The control section 224 can control each section by executing a program incorporated in advance. The control section 224 functions as the following means (A1) to (A3) in cooperation with the feeder-link communication section 221.

(A1) Means for transmitting a measurement report (MR) including a reception level measured for the feeder link frequency F1 to the connection base station 75 to which the relay communication station 21 is connected.

(A2) Means for performing a search detection of a reception signal for the feeder link frequency.

(A3) Means for transmitting a measurement report (MR) including physical-cell identification information (PCI) corresponding to the reception signal and a reception level of the reception signal to the connection base station, for each of the plural reception signals detected by the search detection.

The control section 224 may control the FL antenna 215 so as to track the GW station 70. By tracking the GW station 70 by the FL antenna 215, it is possible to suppress the deterioration of the communication quality of the feeder link due to the movement of the HAPS 20. As a control system of a directional beam of the FL antenna 215, various kinds of systems such as a gimbal system, an electric system (360-degrees beamforming control system), and an electric system (angle-limited beamforming control system+antenna switching) can be used.

The control communication section 226 is configured with, for example, a mobile communication module having a communication function of the LTE or the next generation (for example, the 5th generation), a satellite communication function, or both communication functions, and is assigned terminal identification information (for example, IP address, telephone number, etc.) so as to communicate with the central control server 85. The MAC address of the communication interface may be used to identify the control communication section 226.

Figure 3:
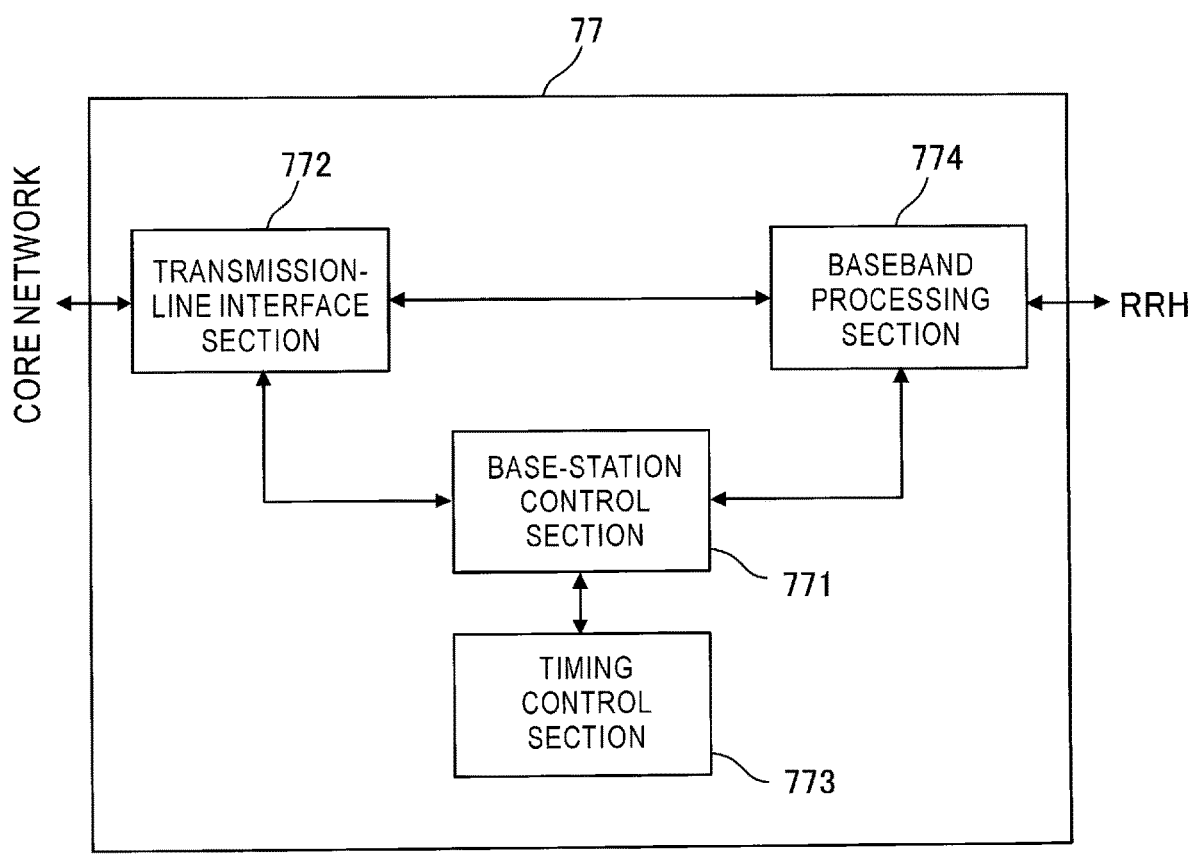
FIG. 3 is a block diagram showing an example of a main configuration of a BBU of a base station according to the embodiment.

FIG. 3 is a block diagram showing an example of a main configuration of the BBU 77 of the base station 75 according to the present embodiment. In FIG. 3, the BBU 77 of the base station 75 is provided with a base-station control section 771, a transmission-line interface section 772, a timing control section 773 and a baseband section 774, as described above.

The base-station control section 771 functions as the following means (B1) to (B4) in cooperation with the baseband section 774.

(B1) Means for receiving a measurement report (MR), which includes a reception level measured by the relay communication station 21 of the HAPS 20 for the feeder link frequency F1 and physical-cell identification information (PCI), from the relay communication station 21.

(B2) Means for detecting an interference of a forward link communication due to an interference wave from another base station other than the connection base station (own station) 75 connected with the relay communication station 21, based on the measurement report (MR).

(B3) Means for comparing a signal-wave reception level and an interference-wave reception level of a forward link communication that reach the relay communication station 21, based on the measurement report (MR) received from the relay communication station 21.

(B4) Means for determining that the interference of the forward link communication is occurred, when a difference between the signal-wave reception level and the interference-wave reception level becomes equal to or less than a predetermined threshold value, or when a ratio of the interference-wave reception level to the signal-wave reception level becomes equal to or more than a predetermined threshold value.

The threshold value used for determining the occurrence of the forward-link communication interference is set in advance based on a configuration of the HAPS communication system, and is held in the base-station control section 771.

It is noted that, an interference suppression process for suppressing the interference of the forward link communication may be an interference suppression process similar to the DL-CoMP (downlink-cooperative multipoint) that can be used for downlink from the base station to the terminal apparatus in the terrestrial-cellular mobile communication. The DL-CoMP is, for example, a technique in which two RRHs of the base station (eNodeB) cooperate with each other and transmit a time-synchronized data to the same terminal apparatus from each of the two RRHs. RRHs 76(1) and 76(2), BBUs 77(1), 77(2) and 78 in the forward link (feeder link) communication of the present embodiment correspond to the RRH and the BBU of the base station (eNodeB) of the DL-CoMP, and the relay communication station 21 of the HAPS 20 in the forward link (feeder link) communication of the present embodiment corresponds to the terminal apparatus of the DL-CoMP.

Figure 4:
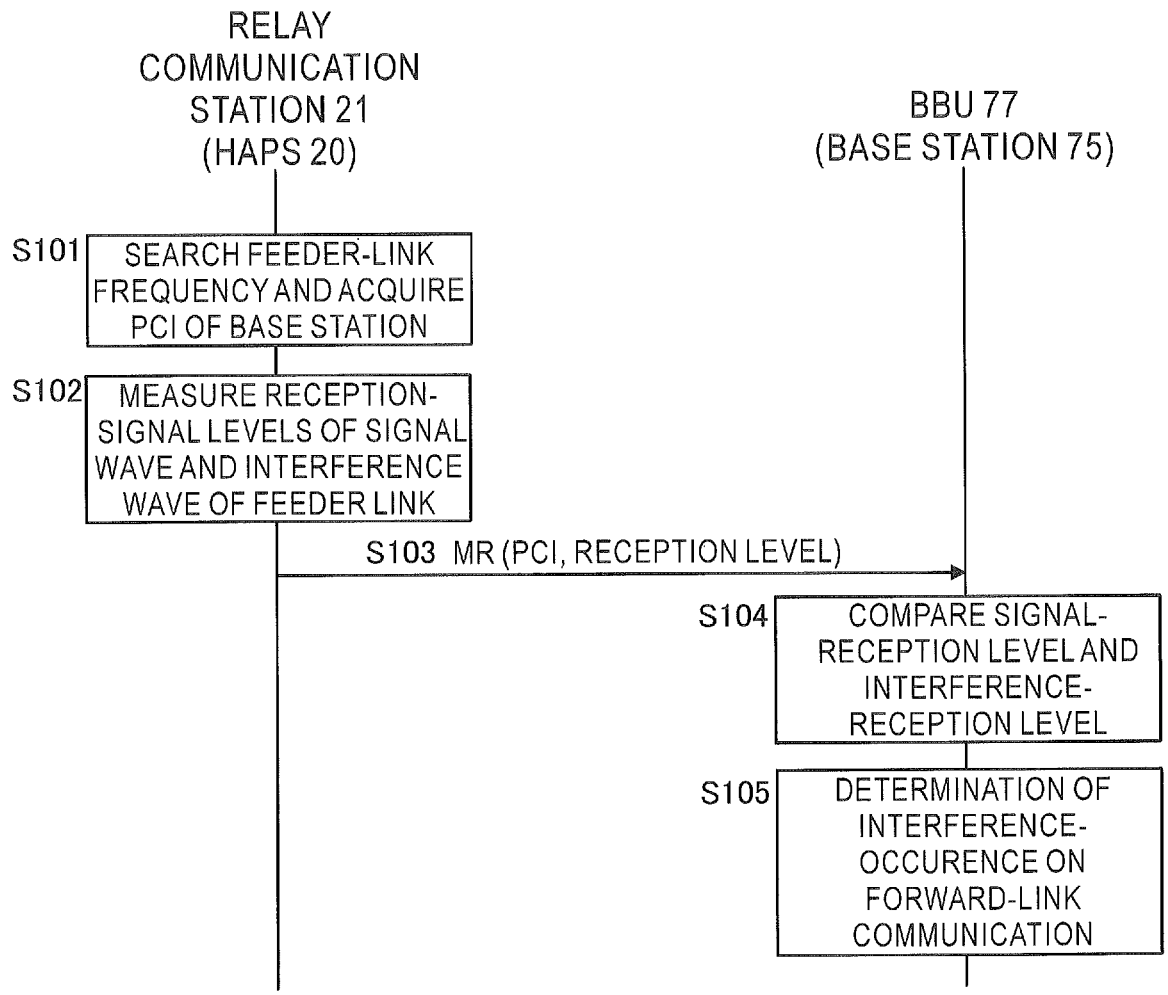
FIG. 4 is a flow sequence diagram showing an example of an interference detection of a forward link communication by the relay communication station of the HAPS and the BBU of the base station in the communication system according to the embodiment.

FIG. 4 is a flow sequence diagram showing an example of interference detection by the relay communication station 21 of the HAPS 20 and the BBU 77 of the base station 75 in the communication system according to the present embodiment.

In FIG. 4, the relay communication station 21 of the HAPS 20 searches the feeder link frequency F1 periodically or irregularly at a predetermined timing, and acquires the physical-cell identification information (PCI) that is broadcast from the found base station (connection base station and interference base station) 75 (S101). For example, the relay communication station 21(1) of the HAPS 20(1) in FIG. 1 acquires physical-cell identification information (PCI=1) included in a synchronization signal (SS) or the like that is broadcast from the connection base station 75(1) connected with the relay communication station 21(1) via the GW station 70(1), and physical-cell identification information (PCI=2) included in a synchronization signal (SS) or the like that is broadcast from the interference base station 75(2) via the GW station 70(2).

Furthermore, the relay communication station 21 measures a signal level of the signal transmitted from the base station (connection base station and interference base station) 75 (S102). For example, the relay communication station 21(1) of the HAPS 20(1) in FIG. 1 measures a reception level (for example, reference-signal reception power) of a forward-communication signal wave S_FWD(1) transmitted from the connection base station 75(1) connected with the relay communication station 21(1) via the GW station 70(1), and a reception level (for example, reference-signal reception power) of a forward-communication interference wave I_FWD(2) transmitted from the interference base station 75(2) via the GW station 70(2). Hereinafter, the reception level of the signal wave S_FWD(1) from the connection base station 75(1) is referred to as a "signal-wave reception level", and the reception level of the reference signal of the interference wave I_FWD(2) from the interference base station 75(2) is referred to as "interference-wave reception level".

Next, the relay communication station 21 lists the physical-cell identification information (PCI) acquired by searching and the reception level (signal-wave reception level, interference-wave reception level), and reports with the MR (Measurement Report) to the base station 75 connected with the own relay communication station (S103). For example, the relay communication station 21(1) of the HAPS 20(1) in FIG. 1 reports the listed PCI and reception level with the MR to the connection base station 75(1) connected with the relay communication station 21(1).

Next, the base station 75 detects the interference of the forward link communication due to the interference wave from another base station, based on the MR received from the relay communication station 21. For example, the base station 75 compares the signal-wave reception level and the interference-wave reception level of the forward link communication that reach the relay communication station, based on the MR received from the relay communication station 21 (S104). The base station 75 determines that the interference of the forward link communication is occurred, when the difference between the signal-wave reception level and the interference-wave reception level becomes equal to or less than the predetermined threshold value, or when the ratio of the interference-wave reception level to the signal-wave reception level becomes equal to or more than the predetermined threshold value (S105).

According to the embodiments of FIG. 1 to FIG. 4, it is possible to early detect the interference of the forward link communication in the feeder link of the HAPS 20, which tends to occur when the HAPS 20 increases in the same area.

Figure 5:
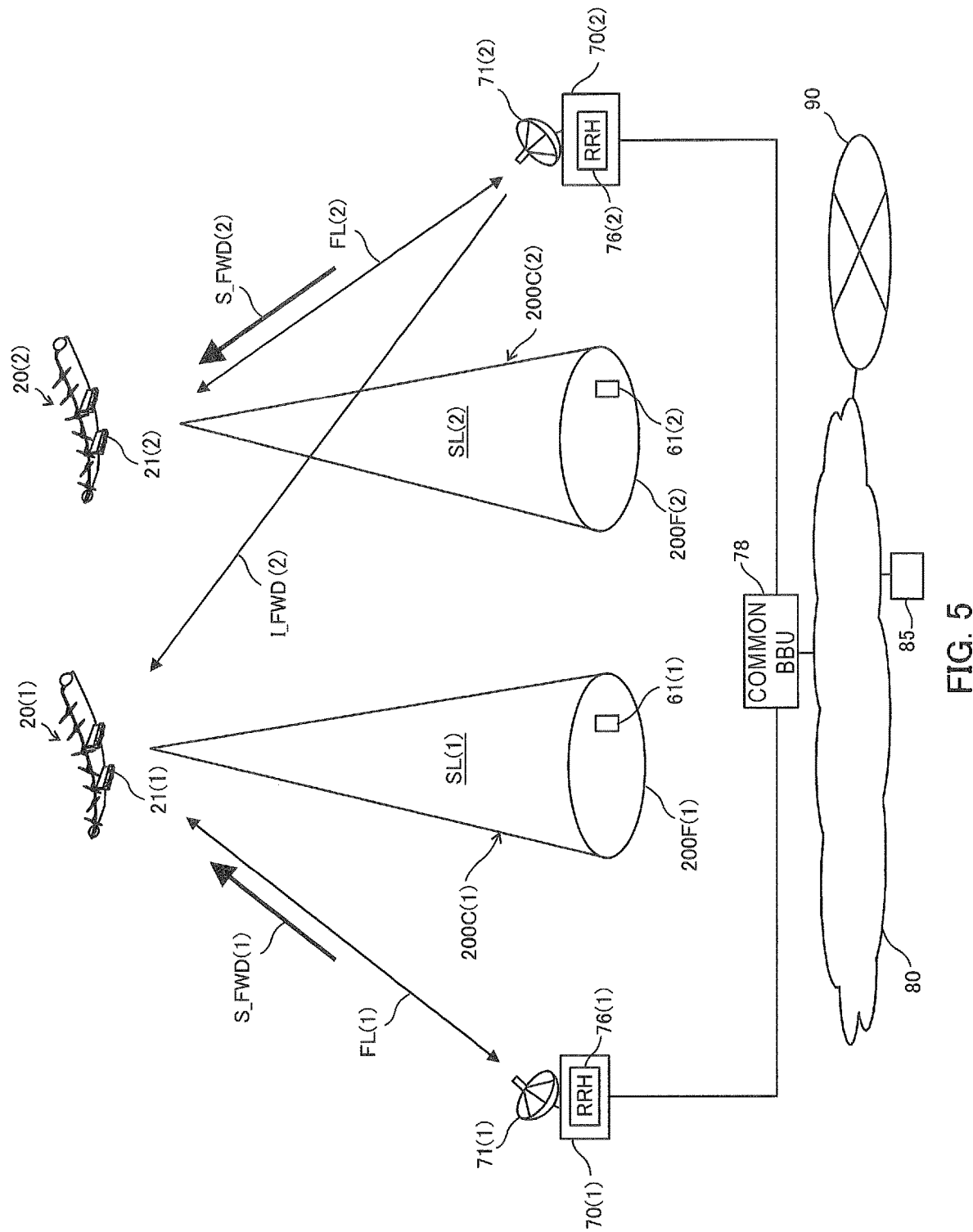
FIG. 5 is an illustration showing another example of a communication system according to an embodiment of the present invention.

FIG. 5 is an illustration showing another example of a communication system according to an embodiment of the present invention. In the communication system of FIG. 5, the BBUs 77 of the plural base stations 75 are aggregated to be configured as the common BBU 78 that is a common baseband processing apparatus. The RRHs 76(1) and 76(2) of the plural base stations 75 are disposed in the corresponding GW stations 70(1) and 70(2), respectively. That is, the plural GW stations 70(1) and 70(2) are accommodated in the common BBU 78 which is the same BBU for the GW stations. Since other configurations are the same as those in FIG. 1 described above, the description thereof is omitted.

In the communication system of FIG. 5, the common BBU 78 has the same configuration as that of FIG. 3, and the base-station control section 771 cooperates with the baseband section 774 to function as a following means (B5) in addition to the above-mentioned means (B1) to (B4).

(B5) Means for performing an interference suppression process that suppresses the interference of the forward link communication by cooperating with other base stations, when the interference of the forward link communication is detected.

The interference suppression process of the forward link (feeder link) performed by the common BBU 78 is, for example, an interference suppression process similar to the DL-CoMP (downlink-cooperative multipoint) that can be used for downlink from a base station to a terminal apparatus in the terrestrial-cellular mobile communication.

Figure 6:
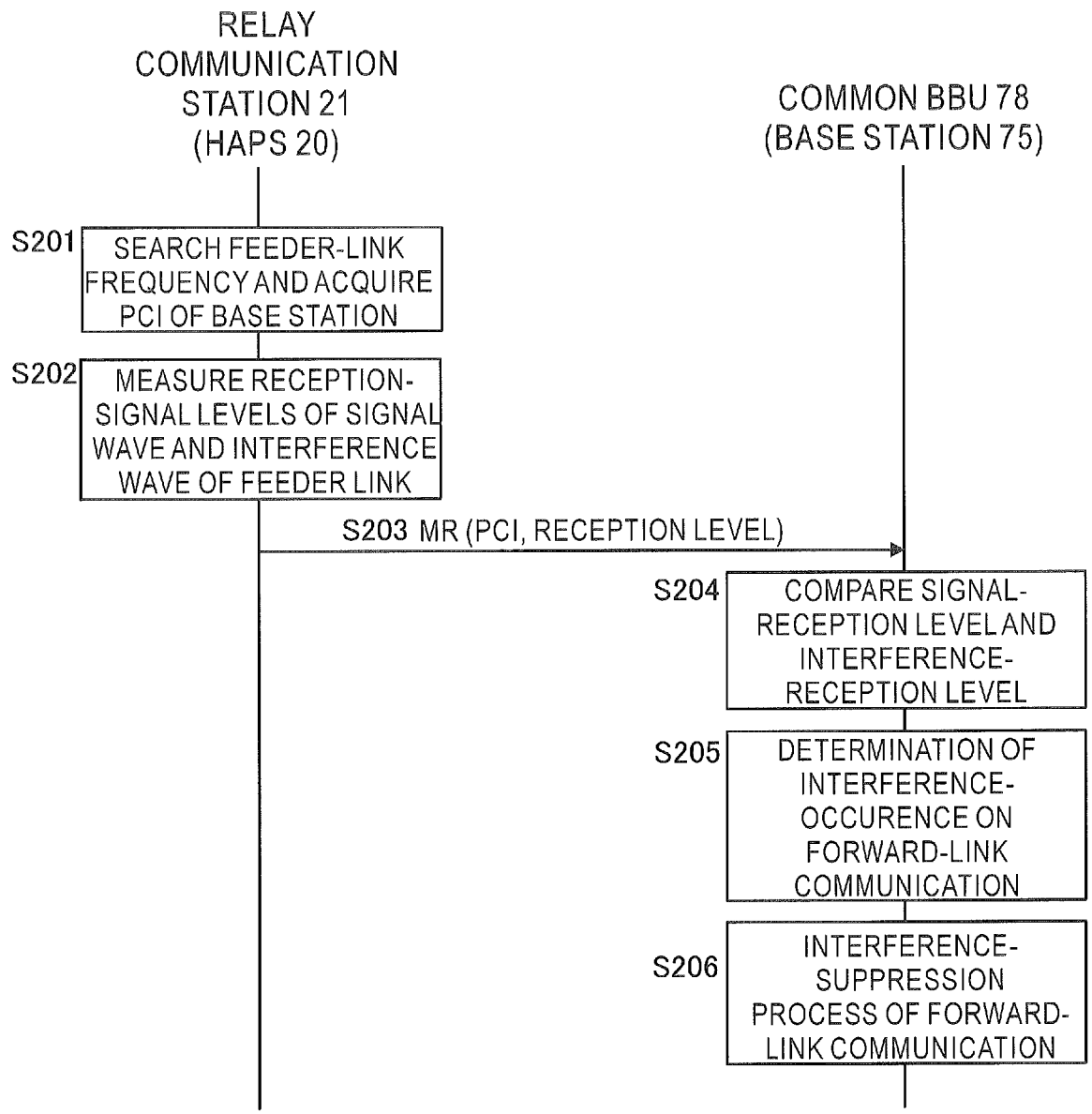
FIG. 6 is a flow sequence diagram showing an example of an interference detection process and an interference suppression process of a forward link communication by the relay communication station of the HAPS and a common BBU in the communication system of FIG. 5.

FIG. 6 is a flow sequence diagram showing an example of an interference detection process and an interference suppression process by the relay communication station 21 of the HAPS 20 and the BBU 77 of the base station 75 in the communication system of FIG. 5. Since steps S201 to S205 in FIG. 6 are the same as steps S101 to S105 in FIG. 4 described above, the description thereof is omitted.

In FIG. 6, in case of determining that the interference of the forward link communication is occurred, the common BBU 78 performs the interference suppression process for suppressing the interference of the forward link communication (S206). For example, the common BBU 78 activates a program of the DL-CoMP incorporated in advance, and performs the interference suppression process that suppresses the interference of the forward link communication due to the interference wave I_FWD(2) heading from the GW station 70(2) to the HAPS 20(1) in FIG. 5.

According to the embodiments of FIG. 5 to FIG. 6, not only the interference of the forward link communication in the feeder link of the HAPS 20, which tends to occur when the HAPS 20 increases in the same area, can be detected at an early stage, but also the interference of the forward link communication can be suppressed.

Next, it is described of an interference detection process and an interference suppression process of a reverse link communication in the feeder link of the communication system of the present embodiment.

When the plural HAPSs 20 are flying in the common area and the plural HAPSs 20 are transmitting the feeder link signal to the GW station 70 as in the communication system of the present embodiment, an interference of the reverse link communication may occur between the feeder links. When the interference of the reverse link communication occurs between the feeder links, the radio communication quality of the reverse link communication may deteriorate in the feeder link, or the reverse link communication may be cut off.

Therefore, in the present embodiment, the same common BBU 78 accommodating the plural GW stations 70 (RRHs 76) performs a reception process of processing the plural reception signals received by the plural GW stations 70 (RRHs 76) by assuming the plural reception signals as reception signals received by the plural GW antennas 71. The common BBU 78 compares a reception level of each of the plural GW antennas 71 obtained by the reception process with each other. For each of the GW antennas 71, the common BBU 78 monitors the reception level of the interference wave I_REV from the HAPS 20, which causes the interference of the reverse link communication, and determines whether or not the interference of the reverse link communication occurs.

Figure 7:
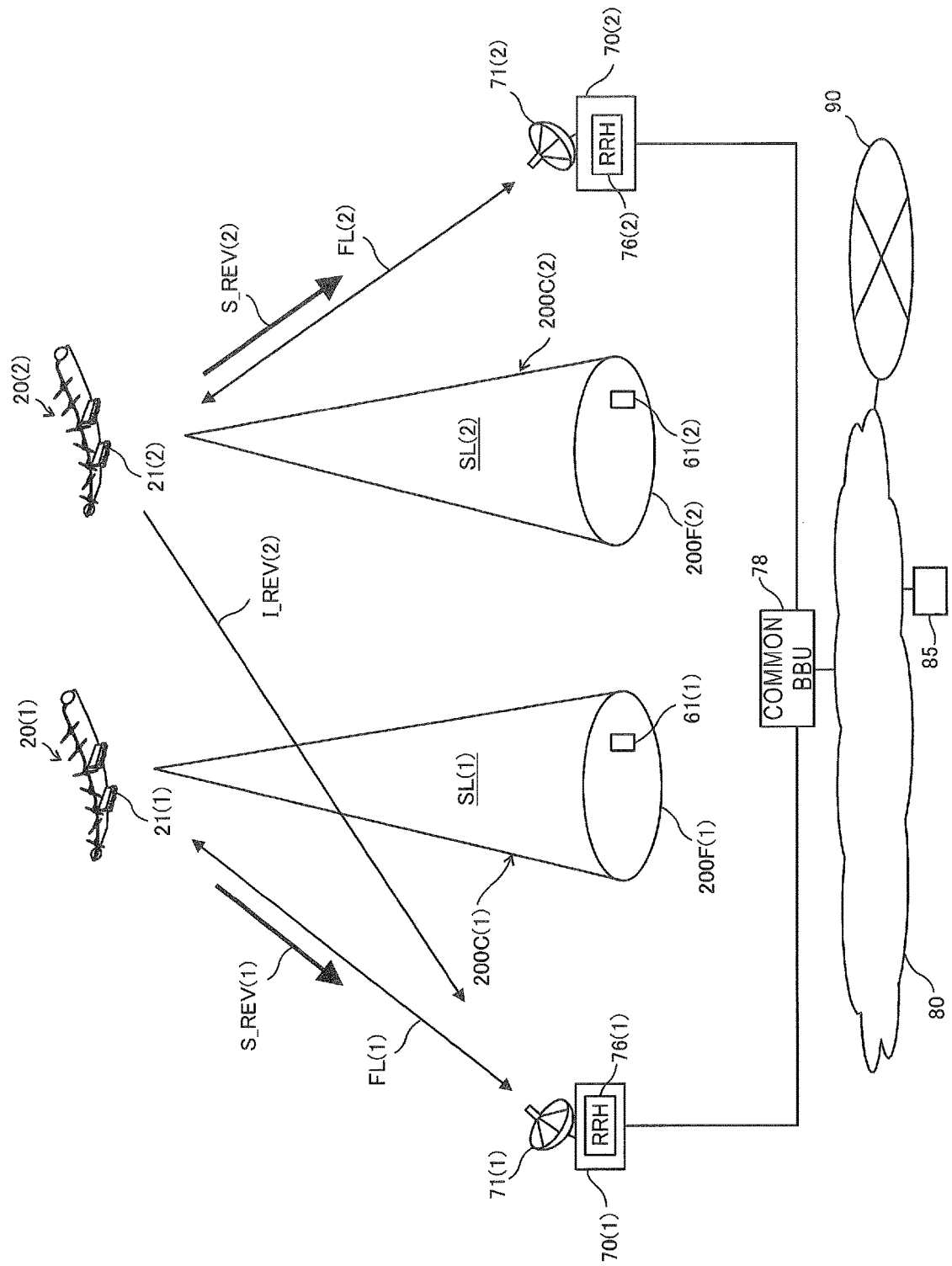
FIG. 7 is an illustration showing yet another example of a communication system according to an embodiment of the present invention.

FIG. 7 is an illustration showing yet another example of a communication system according to an embodiment of the present invention. In FIG. 7, since the basic configuration is the same as that in FIG. 5 described above, the description thereof is omitted. Further, in the communication system of FIG. 7, the common BBU 78 has the same configuration as that of FIG. 3 described above, and the base-station control section 771 functions as the following means (C1) to (C5) in cooperation with the baseband section 774.

(C1) Means for detecting the interference of the reverse link communication due to the interference wave I_REV from the relay communication station 21 of another HAPS 20, which interferes with the signal wave S_REV from the relay communication station 21 of the HAPS 20 connected to the GW station 70, based on the plural reception signals received by the plural GW stations 70 (RRHs 76).
(C2) Means for performing a reception process of processing the plural reception signals received by the plural GW stations 70 (RRHs 76), as reception signals received by the plural GW antennas 71.
(C3) Means for comparing the reception signal level (signal-wave reception level) of the signal wave S_REV of the reverse link communication and the reception level (interference-wave reception level) of the interference wave I_REV for each GW antenna 71, based on the reception signal of each of the plural GW antennas 71 obtained in the reception process.

(C4) Means for determining that the interference in the reverse link communication is occurred, when a difference between the signal-wave reception level and the interference-wave reception level becomes equal to or less than a predetermined threshold value, or when a ratio of the interference-wave reception level to the signal-wave reception level becomes equal to or more than a predetermined threshold value.
(C5) Means for performing an interference suppression process that suppresses the interference of the reverse link communication by making the reception operations by the plural GW stations 70 (RRHs 76) with each other, when the interference of the reverse link communication is detected.

It is noted that, the interference suppression process that suppresses the interference of the reverse link communication may be the interference suppression process similar to the UL-CoMP (uplink-cooperative multipoint) that can be used for the uplink from the terminal apparatus to the base station in the terrestrial-cellular mobile communication. The UL-CoMP is, for example, a technology that receives signals in the form in which the base station (eNodeB) has plural antennas and synthesizes them in the baseband section (BBU) of the base station (eNodeB), by making the two RRHs of the base station (eNodeB) in cooperation with each other and receiving the transmission signal from the terminal apparatus communicating with one of the RRHs by both of the RRHs. The RRHs 76(1) and 76(2), BBUs 77(1), 77(2) and 78 in the reverse link (feeder link) communication of the present embodiment correspond to the RRH and BBU of the base station (eNodeB) of the UL-CoMP, and the relay communication station 21 of the HAPS 20 in the forward link (feeder link) communication of the present embodiment corresponds to the terminal apparatus of the UL-CoMP.

Figure 8:
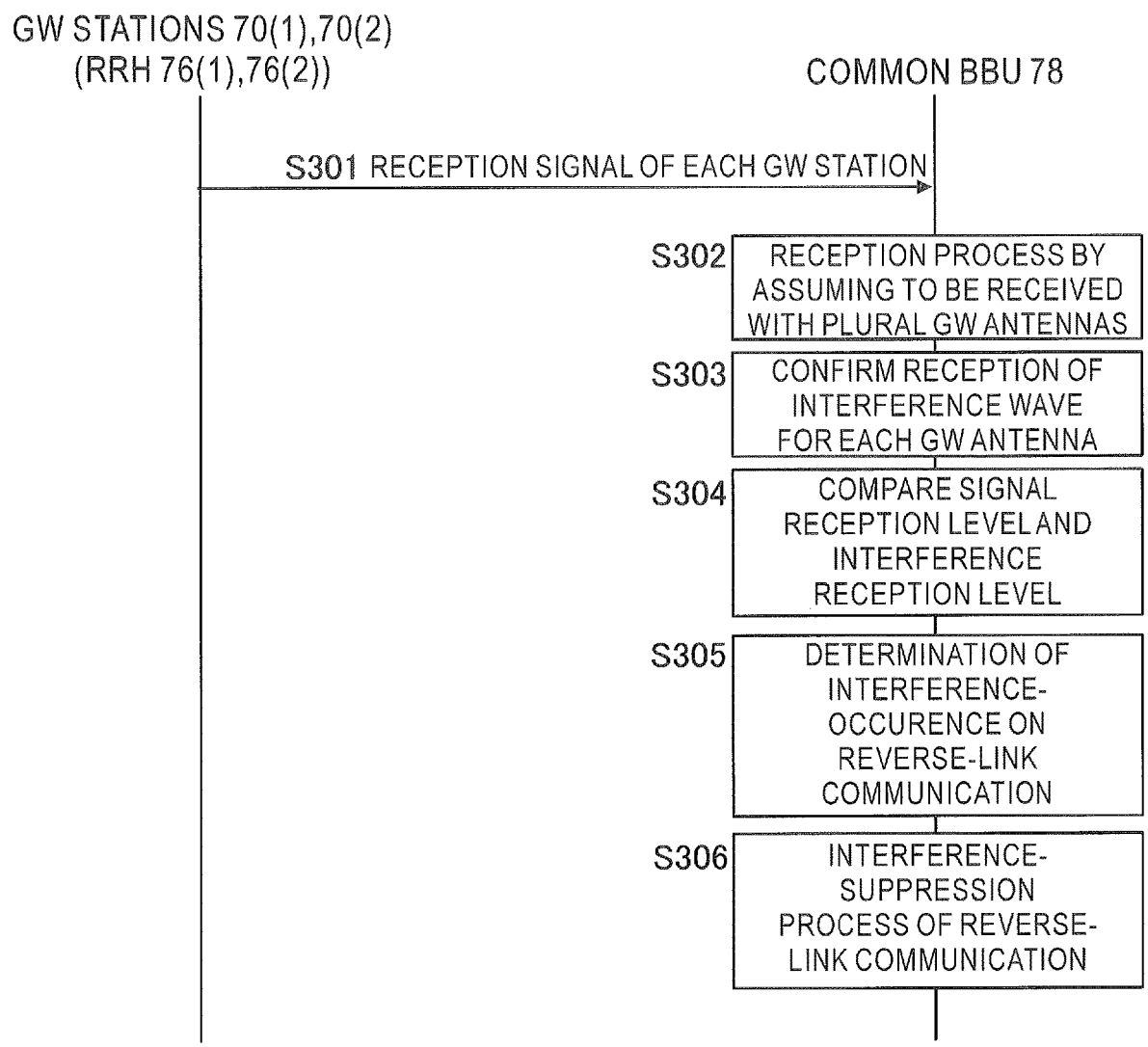
FIG. 8 is a flow sequence diagram showing an example of an interference detection and interference suppression process of a reverse link communication by a common BBU in the communication system of FIG. 7.

FIG. 8 is a flow sequence diagram showing an example of an interference detection and interference suppression process of a reverse link communication by the common BBU 78 in the communication system of FIG. 7.

In FIG. 8, the RRHs 76(1) and 76(2) of the plural GW stations 70(1) and 70(2) receive the radio waves of the reverse link communication of the feeder link of the frequency F1 transmitted from the relay communication stations 21(1) and 21(2) of the HAPSs 20(1) and 20(2) via the GW antennas 71(1) and 71(2), and transfer the received reception signals to the common BBU 78 (S301).

The common BBU 78 performs a reception process of processing the plural reception signals received by the RRHs 76(1) and 76(2) of the plural GW stations 70(1) and 70(2), as reception signals received by the plural GW antennas 71(1) and 71(2) (S302).

Next, the common BBU 78 confirms, for each GW antenna 76, whether or not the interference wave I_REV is received from the relay communication station 21 of another HAPS 20, which interferes with the signal wave S_REV from the relay communication station 21 of the HAPS 20 connected to the GW station 70 (RRH 76), based on the reception signal of each of the plural GW antennas 71(1) and 71(2) obtained in the reception process (S303). For example, in the example of FIG. 7, the common BBU 78 confirms whether or not the interference wave I_REV(2) is received from the relay communication station 21(2) of another HAPS 20(2), which interferes with the signal wave S_REV (1) from the relay communication station 21(1) of the HAPS 20(1) connected to the RRH 76(1) of the GW station 70(1).

Next, when confirming the reception of the interference wave I_REV, for each GW antenna 76, the common BBU 78 compares the reception level (signal-wave reception level) of the signal wave S_REV of the reverse link communication from the relay communication station 21 of the HAPS 20 connected to the RRH 76 of the GW station 70 and the reception level (interference-wave reception level) of the interference wave I_REV of the reverse link communication from the relay communication station 21 of another HAPS 20 (S304). For example, in the example of FIG. 7, when confirming the reception of the interference wave I_REV(2) for the GW antenna 76(1), the common BBU 78 compares the reception level (signal-wave reception level) of the signal wave S_REV(1) of the reverse link communication from the relay communication station 21(1) of the HAPS 20(1) connected to the RRH 76(1) of the GW station 70(1) and the reception level (interference-wave reception level) of the interference wave I_REV(2) of the reverse link communication from the relay communication station 21(2) of another HAPS 20(2).

Next, the common BBU 78 determines, for each GW antenna 76, that the interference of the reverse link communication is occurred, when the difference between the signal-wave reception level and the interference-wave reception level becomes equal to or less than the predetermined threshold value, or when the ratio of the interference-wave reception level to the signal-wave reception level becomes equal to or more than the predetermined threshold value (S305). For example, in the example of FIG. 7, the common BBU 78 determines, regarding the reception signal of the GW antenna 76(1), that the interference of the reverse link communication by the interference wave I_REV(2) with respect to the signal wave S_REV(1) is occurred, when the difference between the signal-wave reception level of the signal wave S_REV(1) and the interference-wave reception level of the interference wave I_REV(2) of the reverse link communication becomes equal to or less than the predetermined threshold value, or when the ratio of the interference-wave reception level of the interference wave I_REV(2) to the signal-wave reception level of the signal wave S_REV(1) becomes equal to or more than the predetermined threshold value.

Next, when the interference of the reverse link communication is detected, the common BBU 78 performs an interference suppression process for suppressing the interference of the reverse link communication by making the plural GW stations 70 (RRHs 76) in cooperation with each other (306). For example, in the example of FIG. 7, when the interference of the reverse link communication by the interference wave I_REV(2) with respect to the signal wave S_REV(1) is detected, the common BBU 78 activates the program of the UL-CoMP incorporated in advance, and performs the interference suppression process that performs a reception process so as to make the RRHs 76(1) and 76(2) of the GW stations 70(1) and 70(2) in cooperation with each other to suppress the interference of the reverse link communication.

According to the embodiments in FIG. 7 and FIG. 8, it is possible to early detect the interference of the reverse link communication in the feeder link of the HAPS 20, which tends to occur when the number of the HAPS 20 increases in the same area, and to suppress the interference of the detected forward link communication.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station, the base station apparatus, the RRH, the BBU and the common BBU described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
61, 61(1), 61(2) terminal apparatus
70, 70(1), 70(2) gateway station (GW station)
71, 71(1), 71(2) antenna for feeder link (GW antenna)
75, 75(1), 75(2) base station
76, 76(1), 76(2) remote radio head (RRH)
77, 77(1), 77(2) baseband processing apparatus (BBU)
78 common baseband processing apparatus (common BBU)
85 central control server
200C, 200C(1), 200C(2) three dimensional cell
200F, 200F(1), 200F(2) foot print
211 antenna for feeder link (FL antenna)
215 antenna for service link (SL antenna)
221 feeder-link communication section
222 service-link communication section
224 control section
226 control communication section
771 base-station control section
772 transmission-line interface section
773 timing control section
774 baseband section

The invention claimed is:

1. A communication system comprising a plurality of movable aerial-floating type communication relay apparatuses that respectively include a relay communication station for performing a service-link radio communication with a terminal apparatus, and plural gateway stations that respectively perform a feeder-link radio communication with the plurality of the communication relay apparatuses,
wherein the communication system comprises a common baseband processing apparatus connected to the plural gateway stations,
wherein the baseband processing apparatus:
detects an interference of a reverse link communication between the feeder links due to an interference wave (I_REV) from a relay communication station of another communication relay apparatus by confirming whether or not a signal wave as the interference wave (I_REV) is received from the relay communication station of the other communication relay apparatus, for each of gateway antennas of the plural gateway stations, the interference wave (I_REV) interfering with a signal wave (S_REV) from the relay communication station of the communication relay apparatus connected to the gateway station, based on plural reception signals received by the plural gateway stations;
performs a reception process of processing plural reception signals received by the plural gateway stations, as reception signals received by plural antennas;
compares a signal-wave (S_REV) reception level and the interference-wave (I_REV) reception level of the reverse link communication for each of the antennas, based on a reception signal of each of the plural antennas obtained in the reception process; and
determines that the interference of the reverse link communication between the feeder links due to the interference wave (I_REV) from the relay communication station of the other communication relay apparatus is occurred, when a difference between the signal-wave (S_REV) reception level and the interference-wave (I_REV) reception level becomes equal to or less than a predetermined threshold value, or when a ratio of the interference-wave (I_REV) reception level to the signal-wave (S_REV) reception level becomes equal to or more than a predetermined threshold value.

2. The communication system according to claim 1, wherein the baseband processing apparatus performs an interference suppression process for suppressing the interference of the reverse link communication by making the plural gateway stations in cooperation with each other, when the interference of the reverse link communication is detected.

3. The communication system according to claim 1, wherein the relay communication station comprises:
a feeder-link communication section that functions as a mobile station for mobile communication, the mobile station communicating with the gateway station; and
a service-link communication section that is connected to the feeder-link communication section and functions as a base station for mobile communication, the base station communicating with the terminal apparatus at a frequency different from that of the feeder link.

4. A common baseband processing apparatus connected to plural gateway stations that respectively perform a feeder-link radio communication with a plurality of movable aerial-floating type communication relay apparatuses, the communication relay apparatuses respectively including a relay communication station of performing a service-link radio communication with a terminal apparatus, the common baseband processing apparatus comprising:
a base-station control section; and
a baseband section, and
wherein, in cooperation with the baseband section, the base-station control section:
detects an interference of a reverse link communication between the feeder links due to an interference wave (I_REV) from a relay communication station of another communication relay apparatus by confirming whether or not a signal wave as the interference wave (I_REV) is received from the relay communication station of the other communication relay apparatus, for each of gateway antennas of the plural gateway stations, the interference wave (I_REV) interfering with a signal wave (S_REV) from the relay communication station of the communication relay apparatus connected to the gateway station, based on plural reception signals received by the plural gateway stations;
performs a reception process of processing plural reception signals received by the plural gateway stations, as reception signals received by plural antennas;
compares a signal-wave (S_REV) reception level and an interference-wave (I_REV) reception level of a reverse link communication for each of the antennas, based on a reception signal of each of the plural antennas obtained in the reception process; and
determines that the interference of the reverse link communication between the feeder links due to the interference wave (I_REV) from the relay communication station of the other communication relay apparatus is occurred, when a difference between the signal-wave (S_REV) reception level and the interference-wave (I_REV) reception level becomes equal to or less than a predetermined threshold value, or when a ratio of the interference-wave (I_REV) reception level to the signal-wave (S_REV) reception level becomes equal to or more than a predetermined threshold value.

5. The baseband processing apparatus according to claim 4, wherein, in cooperation with the baseband section, the base-station control section performs an interference suppression process for suppressing the interference of the reverse link communication by making the plural gateway stations in cooperation with each other, when the interference of the reverse link communication is detected.

6. A method for detecting an interference of a reverse link communication directing from a relay communication station to a gateway station in feeder links between a plurality of movable aerial-floating type communication relay apparatuses and plural gateway stations, the communication relay apparatuses respectively including a relay communication station of performing a service-link radio communication with a terminal apparatus, wherein the method comprises:
detecting an interference of a reverse link communication between the feeder links due to an interference wave (I_REV) from a relay communication station of another communication relay apparatus by confirming whether or not a signal wave as the interference wave (I_REV) is received from the relay communication station of the other communication relay apparatus, for each of gateway antennas of the plural gateway stations, the interference wave (I_REV) interfering with a signal wave (S_REV) from the relay communication station of the communication relay apparatus connected to the gateway station, based on plural reception signals received by the plural gateway stations;
performing a reception process of processing plural reception signals received by the plural gateway stations, as reception signals received by plural antennas;
comparing a signal-wave (S_REV) reception level and an interference-wave (I_REV) reception level of the reverse link communication for each of the antennas, based on the reception signal of each of the plural antennas obtained in the reception process; and
determining that the interference of the reverse link communication between the feeder links due to the interference wave (I_REV) from the relay communication station of the other communication relay apparatus is occurred, when a difference between the signal-wave (S_REV) reception level and the interference-wave (I_REV) reception level becomes equal to or less than a predetermined threshold value, or when a ratio of the interference-wave (I_REV) reception level to the signal-wave (S_REV) reception level becomes equal to or more than a predetermined threshold value.

7. The method according to claim 6, comprising performing an interference suppression process for suppressing the interference of the reverse link communication by making the plural gateway stations in cooperation with each other, when the interference of the reverse link communication is detected.

8. A non-transitory computer readable medium containing a program executed by a computer or a processor provided in a common baseband processing apparatus connected to plural gateway stations that respectively perform a feeder-link radio communication with a plurality of movable aerial-floating type communication relay apparatuses, the communication relay apparatuses respectively including a relay communication station of performing a service-link radio communication with a terminal apparatus, wherein the program comprises:
a program code for detecting an interference of a reverse link communication between the feeder links due to an interference wave (I_REV) from a relay communication station of another communication relay apparatus by confirming whether or not a signal wave as the interference wave (I_REV) is received from the relay communication station of the other communication relay apparatus, for each of gateway antennas of the plural gateway stations, the interference wave (I_REV) interfering with a signal wave (S_REV) from the relay communication station of the communication relay apparatus connected to the gateway station, based on the plural reception signals received by the plural gateway stations;
a program code for performing a reception process of processing plural reception signals received by the plural gateway stations, as reception signals received by plural antennas;
a program code for comparing a signal-wave (S_REV) reception level and an interference-wave (I_REV) reception level of the reverse link communication for each of the antennas, based on the reception signal of each of the plural antennas obtained in the reception process; and
a program code for determining that the interference of the reverse link communication between the feeder links due to the interference wave (I_REV) from the relay communication station of the other communication relay apparatus is occurred, when a difference between the signal-wave (S_REV) reception level and the interference-wave (I_REV) reception level becomes equal to or less than a predetermined threshold value, or when a ratio of the interference-wave (I_REV) reception level to the signal-wave (S_REV) reception level becomes equal to or more than a predetermined threshold value.

9. The non-transitory computer readable medium according to claim 8, further comprising:
a program code for performing an interference suppression process for suppressing the interference of the reverse link communication by making the plural gateway stations in cooperation with each other, when the interference of the reverse link communication is detected.

* * * * *